United States Patent [19]

Kuchuk-Yatsenko et al.

[11] Patent Number: 4,803,330
[45] Date of Patent: Feb. 7, 1989

[54] MACHINE FOR FLASH BUTT WELDING OF PIPES

[75] Inventors: Sergei I. Kuchuk-Yatsenko; Vasily A. Sakharnov; Boris A. Galian; Vladimir F. Zelensky, all of Kiev, U.S.S.R.

[73] Assignee: Institut Elektrosvarki Imeni E.O. Patona Akademii Nak Ukrainskoi, Kiev, U.S.S.R.

[21] Appl. No.: 156,919
[22] PCT Filed: Mar. 26, 1986
[86] PCT No.: PCT/SU86/00024
  § 371 Date: Nov. 19, 1987
  § 102(e) Date: Nov. 19, 1987
[87] PCT Pub. No.: WO87/05840
  PCT Pub. Date: Oct. 8, 1987

[51] Int. Cl.⁴ .............................................. B23K 9/00
[52] U.S. Cl. ........................................ 219/97; 219/101
[58] Field of Search ................. 219/60 R, 61.1, 97, 219/101

[56] References Cited

U.S. PATENT DOCUMENTS 3,684,856  8/1972  Lifshits et al.
4,012,619  3/1977  Lifshits et al. ................... 219/61.1
4,273,985  6/1981  Patson et al. ....................... 219/101
4,323,752  4/1982  Paton et al.
4,436,974  3/1984  Lebedev et al.

FOREIGN PATENT DOCUMENTS 286103  1/1971  U.S.S.R.
292743  3/1971  U.S.S.R.

Primary Examiner—E. A. Goldberg
Assistant Examiner—Melissa C. Chiu
Attorney, Agent, or Firm—Lilling & Greenspan

[57] ABSTRACT

Disclosed is a machine for flash butt welding of pipes located in the bore of the pipes welded together, a housing (2) whereof is provided with rigidly attached thereto a first supporting disc (3) and a second supporting disc (4) and with a pipe flashing-and-upsetting means (5) which has a carrier (7) and a hydraulic actuator (6) for displacing said means along the housing (2) and also has two pipe clamping means (9, 10) each whereof is provided with a carrier (12 and 13) and self-contained hydraulic actuators (11) imparting axial motion to this clamping means.

Bellcranks (24) located equidistantly apart all the way around the periphery of the outside surface of each carrier (12, 13) of pipe clamping means (9, 10) are pivitally attached thereto with provision for rocking in the radial direction, whereby one end of every bellcrank (24) interacts at one side (26) thereof with rigid stops (27, 31) provided on the first supporting disc (3) and on that side of the carrier (7) of pipe flashing-and-upsetting means (5) which faces the pipe clamping means (9, 10) the opposite side of the bellcrank end interacting with a spring-loaded stop (29) provided on the carrier (12,13) of each pipe clamping means (9,10), while the opposite end of every bellcrank (24) is provided with an aligning roller (25) contacting in inner wall of the pipes (1).

1 Claim, 2 Drawing Sheets

MACHINE FOR FLASH BUTT WELDING OF PIPES

TECHNICAL FIELD

The invention relates to equipment for flash butt welding and has specific reference to machines for ring seam welding of pipes.

PRIOR ART

When a machine for flash butt welding is moved by a roller supported driving means from one butt joint to another through the bore of the pipe, the current-applying clamping blocks must stay clear of the inner wall of the axis of the displacing machine and that of the pipe or a too narrow clearance between the current-applying blocks and the inner pipe wall can cause the blocks to contact surface irregularities of the pipe wall or remnants of flash thereon. Rapid wear of the current-applying blocks and breakage or stoppage of the welding machine are therefore frequent occurences.

Known in the art is a machine for flash butt welding of pipes (cf. USSR Inventor's Certificate No. 286 103, Cl. 21h 29/10, 1969) in a housing whereof there is secured a rod carrying pipe clamps each whereof is provided with a flanged slider located on the rod with provision for longitudinal displacement, whereby every slider interacts through a projection with a turning lever carrying a supporting roller and through the flange with a bar of a spring-loaded block fitted to the housing. The tension of the springs acting on the blocks is selected depending on the weight of the structure. If the radial displacement of a supporting roller exceeds that of the rest of rollers, as this may be the case when the inner wall of the pipe is elliptical, the turning lever of the roller concerned acts with its projection on the slider which transmits this action to the rest of rollers. This brings about a self-alignment of the machine for flash butt welding throughout the process.

Nevertheless, to fit a new pipe to the machine for welding is a problem because of the initial setting of the rollers which exceeds a maximum possible pipe diameter, and much effort is required in order to overcome the tensions of springs the rollers are subjected to.

Also known in a machine for flash butt welding of pipes, preferably those of large diameter, (cf. USSR Inventor's Certificate No. 292 743, Cl. B23K 11/04, 1969) in a housing whereof there are provided clamping means, a flashing-and-upsetting means and two retaining means which are located at either end of the pipes welded together to sustain the upsetting force. The machine is provided with aligning rollers with individual actuating means which cause the rollers to displace radially towards the inner walls of the pipes welded. The aligning rollers are fitted each to an end of a bellcrank and the other end of every bellcrank contacts a common disk which, being displaced along the housing of the machine by an individual hydraulic actuator, causes the rollers to swing about the fulcrum of every particular bellcrank so as to come closer to, or farther from, the inner walls of the pipes welded. An aligning mechanism of the above layout invites no difficulties in fitting the welding machine into the hore of a new pipe.

However, this mechanism and the indiviudal means of actuating the aligning rollers complicate the construction and increase the weight of the machine. Additional operations which must be coped with during welding in this case render automatic control of the machine a problem.

Further known is a machine for flash butt welding of pipes which operates in the bore of the pipes welded together (cf. USA Pat. No. 4,273,985, Cl. B23K 11/04, dated June 16, 1981).

The known machine for flash butt welding of pipes consists a housing which is aligned with the axis of the pipes welded and has a first supporting disc and a second supporting disc located its ends. A pipe flashing-and-upsetting means capable of displacing along the housing due to individual hydraulic actuators is fitted to the housing with the aid of a carrier next to the second supporting disc. Means of clamping the pipes welded with carriers fitted to the housing and with individual hydraulic actuators serving to displace said means along the axis of the housing are located the pipe flashing-and-upsetting means and the first supporting disc. The carriers of the pipe clamping means and the pipe flashing-and-upsetting means are fitted to the housing of the machine with provision for axial displacement. A welding transformer is interposed between the pipe clamping means.

To facilitate the machine travel in the bore of the pipes welded together provision is made in the carriers of the pipe clamping device for supporting rollers pivotally mainted therein with aid of fulcrum pins.

Pipes are commonly manufactured to tolerances as large as, for example, ±4 mm on the diameter and from +0.4 to −1.2 mm on the wall thickness. Apart from that, pipes can corrugate and may contain flash in their bore of a height between 8 and 20 mm. To negotiate these obstacles when the welding machine is being advanced along the pipe bore to the next joint, the supporting rollers are fitted to the carriers of the pipe clamping means so as to stay clear of the inner wall of the pipe. In being moved along the pipe bore, the welding machine is supported by the rollers and its axis therefore displaces out-of-true with the axis of the pipeline. Under such circumstances, the current-applying clamping blocks of the machine which are fitted with a limited free travel owing to the space in the pipe bore being at premium graze the surface irregularities of the pipe wall and, as a result, rapidly wear away. Large lumps of flash may even block the advance of the machine.

ESSENCE OF THE INVENTION

The object of the present invention is to provide a flash butt welding machine which is reliable in operation due to a new method of its alignment during the travel down a pipe.

This object is realized by disclosing a machine for flash butt welding of pipes which operates in the bore of the pipes welded together and comprises a housing located in alignment with the axis of the pipes and provided with a first supporting disc and a second supporting discs at the ends; a pipe flashing-and-upsetting means with a hydraulic actuator displacing said means along the axis of the housing, a carrier of said means being fitted to the housing next to the second supporting disc; two pipe clamping means with individual hydraulic actuators them along the axis of the housing, carriers of said two means being fitted to the housing between the first supporting disc and the pipe flashing-and-upsetting means, wherein according to the invention bellcranks pivotally attached to the outside surface of each carrier of the pipe clamping means are provided at least at three points spaced equidistantly apart all the way around the periphery of each carrier with provision for rocking in the radial direction, and rigid stops are provided on the first supporting disc and on that side of the carrier of pipe flashing-and-upsetting means which faces the pipe clamping means, whereby every bellcrank is fitted with provision for interacting at one side of its free end with one of said rigid stops which equal the bellcranks in number and at the outher side of said end with a spring-loaded stop provided on the carrier of every pipe clamping means and the opposite end of every bellcrank is fitted with an aligning roller contacting the inner wall of the pipes welded together.

The rocking bellcranks which are provided with aligning rollers and are fitted to the carriers of pipe clamping means so as to contact the rigid stops at one side and the spring-loaded stops at the other side permit the welding machine to be aligned with the axis of the pipe while welding every joint or being moved to the next joint. Idle strokes of the hydraulic actuators which operate the pipe clamping means facilitate the alignment.

The disclosed machine for flash butt welding of pipes is of a less complex design and of lighter weight than its predecessors. Its power requirements are also lower than ever before.

SUMMARY OF THE DRAWINGS

The invention will now be described by way of example with reference to the accompanying drawings in which

Referring to FIG. 1, the machine for flash butt welding of pipes according to the invention is located in the bore of the pipes 1 welded and incorporates a housing 2 the axis whereof is aligned with the axis of the pipes 1. A first supporting disc 3 and a second supporting disc 4 are fitted at the ends of the housing 2.

Figure 1:
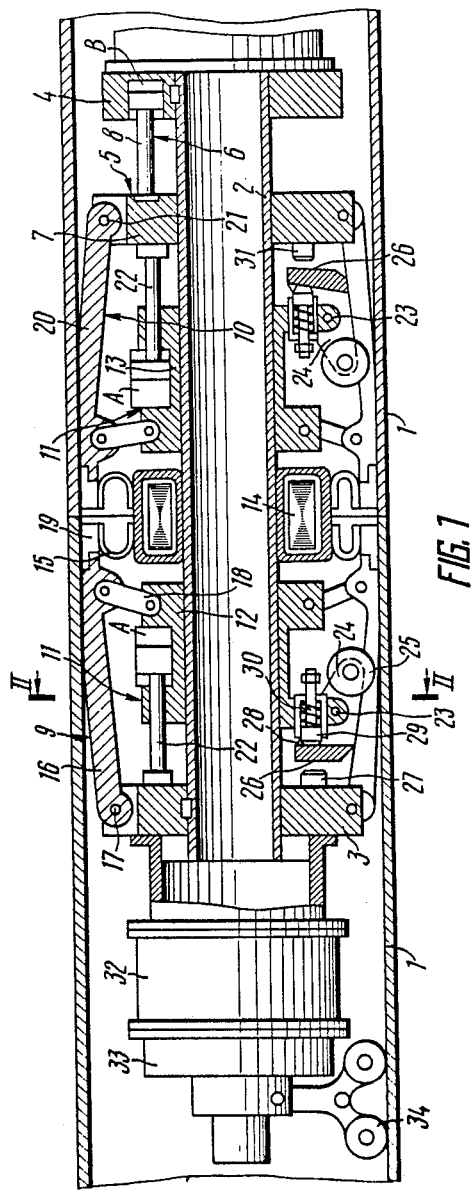
FIG. 1 is a sectional elevation of the machine for flash butt welding of pipes according to the invention.

A pipe flashing-and-upsetting means 5 is located next to the second supporting disc 4. It can be displaced along the axis of the housing 2 by an individual hydraulic actuator 6 and has a carrier 7 which is located on the housing 2 of the machine with provision for displacement along the axis thereof.

The hydraulic actuator 6 of the pipe flashing-and-upsetting means 5 which causes this means to displace along the axis of the housing 2 consists of hydraulic cylinders located symmetrically all the way around the perimeter of the housing 2. The cylinders proper are rigidly attached to the second supporting disc 4 and piston rods 8 are fastened to the carrier 7 of the pipe flashing-and-upsetting means 5.

Pipe clamping means 9 and 10 with individual hydraulic actuators 11 which displace them along the axis of the housing 2 are fitted to the housing 2 by means of carriers 12 and 13, respectively, between the pipe flashing-and-upsetting means 5 and the first supporting disc 3. The carriers 12 and 13 of the pipe clamping means 9 and 10 are fitted to the housing 2 with provision for displacing along the axis thereof. A welding transformer 14 with flexible leads 15 is fitted to the housing 2 between the clamping means 9 and 10.

The pipe clamping means 9 incorporate clamping arms 16 which are located equidistantly apart and symmetrically with respect to the axis of the housing 2. Every clamping arm 16 pivots about a fulcrum pin 17 fitting into the first supporting disk 3 with one end and is pivotally attached with its other end, which is next to the transformer 14, to a outward thrusting toggle 18. This, in its turn, is pivotally attached to the carrier 12 of the pipe clamping means 9 with its other end. A current-applying clamping block 19 connected to a terminal of the transformer 14 via a flexible lead 15 is fitted to that end of every clamping arm 16 which is located next to the transformer 14.

The other pipe clamping means 10 is of the same layout as indicated above except that its every clamping arm 20 pivots about a folcrum pin 21 fitting into the carrier 7 of the pipe flashing-and-upsetting means 5 with one end and the current-applying clamping block 19 is connected to the other terminal of the transformer 14 via a relevant flexible lead 15.

The individual hydraulic actuators 11 of the pipe clamping means 9 and 10 comprise each a plurality of cylinders located symmetrically all the way around the periphery of the housing 2. The cylinders proper of the means 9 and 10 are rigidly attached to the carriers 12 and 13, respectively, and the piston rods 22 of the pipe clamping means 9 are secured to the first supporting disc 3 where as the piston rods of the pipe clamping means 10 are held fast to the carrier 7 of the pipe flashing-and-upsetting means 5.

Bellcranks 24 capable of rocking in the radial direction about fulcrum pins 23 through slots provided in the outside surface of the carriers 12 and 13 (FIG. 2) of the pipe clamping means 9 and 10, respectively, are located at least at three points spaced equidistantly apart all the way along the circumference of the carriers 12,13 (there are three bellcranks on every carrier 12 and 13 in the case under consideration). An aligning roller 25 contacting the inner wall of the pipes 1 welded together is fitted to an end every bellcrank 24 with the aid of a fulcrum pin.

Figure 2:
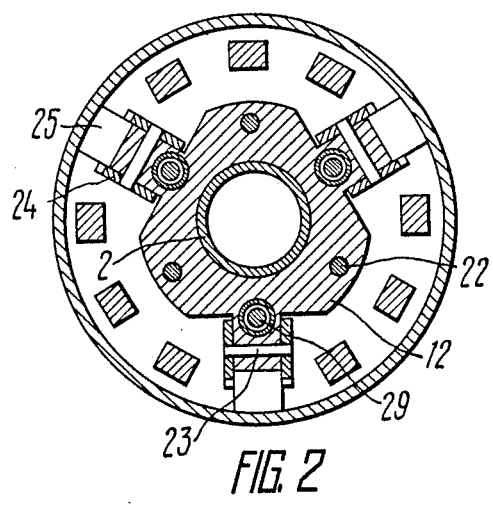
FIG. 2 is a section on line II—II of FIG. 1.

The other end of every bellcrank 24 fitted to the carrier 12 of the pipe clamping means 9 is capable of contacting at one side 26 a rigid stop 27 provided on that side of the supporting disc 3 which faces the pipe clamping means 9, the rigid stops 27 equalling the bellcranks 24 in number, in this particular case, three (FIG. 2).

The opposite side 28 (FIG. 1) of the same end of the bellcrank 24 is adapted for contacting a spring-loaded stop 29 which is provided on the carrier 12 of the clamping means 9 (the amount of the stops equalling the bellcranks in number, that is, three in this particular case), the stop 29 being loaded with a spring 30.

The bellcranks 24 fitted to the carrier 13 of the pipe clamping means 10 are of the same design except that each of them contacts at one side a rigid stop 31 provided on the carrier 7 of the pipe flashing-and-upsetting means 5. The stops 31 equal the bellcranks 24 in number (three in this case).

A pump unit 32 and a mechanism 33 with drive rollers 34 serve to advance the machine for flash butt welding down the bore of the pipes welded together.

In operation, a drive 33 (FIG. 1) advances the welding machine down the bore of a welded pipe section so that the front and of the machine extends outside the pipe 1, and the pipe end face is located exactly between the pipe clamping means 9 and 10, e.g. at a point where the next weld will be applied.

The machine is disconnected from the power supply and a pipe 1 to be welded is slipped on the front end of the machine until it comes abutting against the other pipe 1. The machine is connected to the source of power and fluid is admitted into spaces A of the individual hydraulic actuator 11 of the pipe clamping means 9 under a pressure.

The piston rods 22 of the pipe clamping means 9 remain immovable, being rigidly attached to the first supporting disc 3 which is secured to the housing 2. Therefore set into motion are the cylinders and moving integrally therewith along the housing 2 towards the joint is the carrier 12 of the pipe clamping means 9. The clamping arms 16 which are mechanically linked to the carrier 12 move outwards and press the current-applying clamping blocks 19 against the inner surface of the pipe 1. A further advance of the carrier 12 cause the clamping arms 16 to clamp the pipe 1. Since the carrier 12 is coaxial with the housing 2 and the clamping arms 16 are all of the same length and swing through the same angle, the pipe clamping means 9 sets the welding machine in alignment with the pipe 1. Their axes coincide with one another.

Thus, the machine has been clamped in the bore of the pipe for flash butt welding and its axis has been brought into alignment with that of the pipe.

During the period elabpsed in clamping and aligning the machine in the pipe 1, the spring-loaded stops 29 (FIG. 1) come abutting against the free ends 28 of the bellcranks 24 and, as a result, the opposite ends of the bellcranks 24 carrying the aligning rollers 25 move away from the inner surface of the pipe 1.

The pipe 1 to be welded is clamped by the clamping means 10 in the same way as described above. The only difference is that the piston rods 22 of the individual hydraulic actuator 11 of the pipe clamping means 10 come abutting against the carrier 7 of the pipe flashing-and-upsetting means 5 which, in its turn, abuts against the second supporting disc 4 attached to the housing 2.

At this stage, the pipe 1 to be welded is clamped and aligned with the axis of the machine which has been already aligned with the axis of the pipe 1.

The welding transformer 14 is connected to a source of power and current is applied to the clamping blocks 19 and hence to the pipes 1 over the flexible leads 15.

Simultaneously with applying the current, fluid under a pressure is admitted into spaces B of the cylinders of the hydraulic actuator 6 of the pipe flashing-and-upsetting means 5. Since the cylinders are immovable, being rigidly attached to the second supporting disc 4, the fluid admitted thereinto displaces the piston rods which are rigidly fitted to the carrier 7 of the pipe flashing-and-upsetting means 5. The carrier 7 is set into motion as well and also moving is the pipe clamping means 10 which is linked to the carrier 7. The pipe 1 to be welded gradually moves integrally with the clamping means 10, and the end faces of the two pipes 1 come close to one another so that flashing is brought about followed by an upsetting action. The pipes are welded so together.

Figure 3:
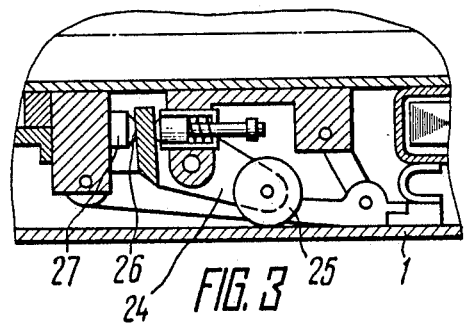
FIG. 3 shows a bellcrank in contact with a rigid stop on the second supporting disc.

The fluid contained in spaces A and B of all hydraulic actuators s drained therefrom and fed into the opposite spaces. All parts of the machine return into the original position. In displacing along the housing 2 away from the weld, the carrier 12 of the pipe clamping means 9 travels towards the first supporting disc 3 and the carrier 13 of the pipe clamping means 10 approaches the carrier 7 of the pipe flashing-and-upsetting means 5, whereby the current-applying clamping blocks 19 release their grip of the pipes 1 which have been welded together. The carriers 12, 13 also cause the bellcranks 24 to contact with their sides 26 the rigid stops 27 (FIG. 3) and 31 (FIG. 1) located on the supporting disc 3 and the carrier 7 of the pipe flashing-and-upsetting means 5, respectively.

During their further travel along the housing 2 of the machine, the carriers 12, 13 of the pipe clamping means 9, 10 cause the bellcranks 24 to press with their sides 26 against the rigid stops 27, 31. As a result, the bellcranks 24 turn about their fulcrum pins on the carriers 12,13 so that the aligning rollers 25 provided at the opposite ends of the bellcranks 24 come down on the inside surface of the pipes 1 welded together (FIG. 3) and are pressed against same.

While the current-applying clamping blocks 19 (FIG. 1) release their hold of the pipes with the assistance of the individual hydraulic actuators 11 of the pipe clamping means 9,10 as mentioned above, the machine stays in alignment with the axis of the pipes 1 welded together by virtue of the bellcranks 24 which are operated by the individual hydrualic actuators 11.

To apply a new pipe for welding without difficulty, the aligning rollers 25 of the bellcranks 24 are displaced towards the centre of this pipe by admitting fluid under a low pressure into spaces A of the hydraulic actuator 11 of the pipe clamping means 10. On fitting the pipe to the machine, fluid is admitted into the opposite spaces of the cylinders which press the aligning rollers 25 against the inside wall of the pipe 1, keeping thus the axis of the machine in alignment with the axis of the pipe 1. To preserve the self-aligning ability of the machine in welding pipes of a larger diameter or wall thickness, the tension of the springs 30 must be adjusted.

The bellcranks 24 which are fitted with the aligning rollers 25 and are attached to the outside surface of the carriers 12, 13 of the pipe clamping means 9, 10, respectively, keep the welding machine in the bore of the pipe always in a coaxial position with the pipe 1 without any special means of alignment. The alignment is brought about during the idling stroke of the cylinders of the individual actuators 11 of the pipe clamping means 9, 10 which return the carriers 12, 13 into their initial position preparatory to clamping a new pipe 1 for welding.

The disclosed arrangement of the carriers 12, 13 of the pipe clamping means 9, 10, respectively, which provides for fitting the bellcranks 24 with their aligning rollers 25 to the outside surface of said carriers at least at three points spaced equidistantly apart along the circumference of the carriers 12, 13 significantly widens the scope of application of the machine for flash butt welding, simplifies its construction, reduces weight and power requirements. An invariably accurate alignment of the machine in the bore of the pipe improves the quality of welds. This feature is of particular importance in laying trunk pipelines when not excluded is the possibility that pipes with large tolerances on the diameter and wall thickness must be used.

INDUSTRIAL APPLICABILITY

The invention may be used to advantage in the field for welding together large-diameter sections of trunk pipelines carrying natural gas or oil and in stationary conditions as well.

What is claimed is:

1. A machine for flash butt welding of pipes which is located in the bore of the pipes (1) welded together and which comprises a housing (2) arranged coaxially with said pipes (1) welding together and provided with a first supporting disc (3) and a second supporting disc (4) which are fitted to said housing at the opposite ends thereof; a pipe flashing-and-upsetting means (5) with a hydraulic actuator (6) serving to displace same along the axis of the housing 2, a carrier (7) of said means being located on the housing (2) of the machine next to the second supporting disc (4); two pipe clamping means (9, 10) with individual hydraulic actuators (11) for displacing same along the axis of the housing, carriers (12, 13) of pipe clamping means being located on the housing (2) between the first supporting disc (3) and the carrier (7) of the pipe flashing-and-upsetting means characterized in that bellcranks (24) pivotally attached to the outside surface of each carrier (12, 13) of the pipe clamping means (9, 10) are provided at least at three points spaced equidistantly apart all the way around the periphery of each carrier (12, 13) with provision for rocking in the radial direction about fulcrum pins (23) and rigid stops (27, 31) are provided on the first supporting disk (3) and on that side of the carrier (7) of the pipe flashing-and-upsetting means (5) which faces the pipe clamping means (9, 10) whereby every bellcrank (24) is fitted with provision for interacting at one side (26) of its free end with one of the rigid stops (27, 31) which equal the bellcranks (24) in number and at the other side (28) of the end, with a spring-loaded stop (29) provided on the carrier (12, 13) of every pipe clamping means (9, 10) and the opposite end of every bellcrank (24) is fitted with an aligning roller (25) contacting the inner wall of the pipes (1) welded together.

* * * * *